United States Patent [19]

Chen

[11] Patent Number: 5,573,746
[45] Date of Patent: Nov. 12, 1996

[54] ZEOLITE SYNTHESIS WITH AMINO ACID DIRECTING AGENTS

[75] Inventor: Catherine S. H. Chen, Berkeley Heights, N.J.

[73] Assignee: Mobil Oil Corporation, Fairfax, Va.

[21] Appl. No.: 469,180

[22] Filed: Jun. 6, 1995

[51] Int. Cl.$^6$ .............................. C01B 39/26; C01B 39/40
[52] U.S. Cl. .................. 423/705; 423/706; 423/708; 423/DIG. 22; 423/DIG. 25; 502/62; 502/77
[58] Field of Search .................................. 423/701, 702, 423/704, 705, 706, 708, DIG. 22, DIG. 25; 502/62, 77

[56] References Cited

U.S. PATENT DOCUMENTS

| | | | |
|---|---|---|---|
| 3,676,063 | 7/1972 | Elo, Jr. et al. | 423/701 |
| 4,544,538 | 10/1985 | Zones | 423/706 |
| 4,557,917 | 12/1985 | Valyocsik et al. | 423/702 |
| 4,610,855 | 9/1986 | Valyocsik et al. | 423/702 |
| 4,665,110 | 5/1987 | Zones | 423/706 |
| 4,826,667 | 5/1989 | Zones et al. | |
| 5,202,014 | 4/1993 | Zones et al. | 423/704 |
| 5,256,391 | 10/1993 | Chen et al. | 423/706 |

*Primary Examiner*—Karl Group
*Assistant Examiner*—David Sample
*Attorney, Agent, or Firm*—Ronald A. Bleeker; Malcolm D. Keen; Peter W. Roberts

[57] ABSTRACT

Methods for using amino acid as a directing agent in zeolite synthesis are disclosed comprising the steps of:

(a) forming a reaction mixture containing water, an alumina source, a silica source, an alkali metal oxide source, and an amino acid as an exterior directing agent; and (b) recovering a porous inorganic solid from said reaction mixture of step (a).

11 Claims, 9 Drawing Sheets

SEM OF ZSM-5 SYNTHESIZED WITH
6-AMINOHEXANOIC ACID IN EXAMPLE 14

SEM OF ZSM-5 SYNTHESIZED WITH
N-2-ADAMANTYLGLYCINE IN EXAMPLE 4

SEM OF MORDENITE SYNTHESIZED WITH
N-3-DIAMANTYLGLYCINE IN EXAMPLE 8

SEM OF ZSM-5 SYNTHESIZED WITH
6-AMINOHEXANOIC ACID IN EXAMPLE 14

SEM OF ZSM-5 SYNTHESIZED WITH
N-CYCLOHEXYLGLYCINE IN EXAMPLE 10

SEM OF MORDENITE SYNTHESIZED WITH
6-AMINOHEXANOIC ACID IN EXAMPLE 12

ZEOLITE SYNTHESIS WITH AMINO ACID DIRECTING AGENTS

FIELD OF THE INVENTION

This invention relates to zeolite synthesis using amino acids as directing agents. It particularly relates to the synthesis of ZSM-5 of large crystal size and high catalytic activity.

BACKGROUND OF THE INVENTION

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper, No. 19 Revised, Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation.

This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. However, it is difficult to obtain large ZSM-5 crystals when $SiO_2/Al_2O_3$ ratio is low ($\leq 30$). U.S. Pat. No. 3,941,871 (U.S. Pat. No. Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "H$_1$" phase or hydrate of aluminum phosphate of F.d'Yvoire, *Memoir Presented to the Chemical Society*, No. 392, "Study of Aluminum Phosphate and Trivalent Iron", Jul. 6 1961 (received), pp. 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Angstroms. R. Szostak et al., *Zeolites: Facts, Figures, Future*, Elsevier Science Publishers B. V., 1989, present work showing cacoxenite as being very hydrophilic, i.e. adsorbing nonpolar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, as a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

The synthetic porous inorganic materials are generally produced from a reaction mixture (or "gel") which contains the precursors of the synthetic material. Because the necessary seed crystals may be unavailable (particularly when the porous inorganic material is new and has not previously been synthesized) it would be desirable to provide a synthesis method which generates a selected porous inorganic material from a particular reaction mixture containing no nucleating seeds.

The reaction mixture for a particular porous inorganic material may also contain an organic directing agent or templating agent. The terms "templating agent" and "directing agent" are both used to describe compounds (usually organics) added to the reaction mixture to promote formation of the desired porous inorganic solid.

Bulky organic bases which are favored as directing agents include cetyltrimethylammonium (CTMA), myristyltrimethylammonium ($C_{14}$TMA), decyltrimethylammonium, cetyltrimethylphosphonium, octadecyltrimethylphosphonium, benzyltrimethylammonium, cetylpyridinium, dodecyltrimethylammonium, and dimethyldidodecylammonium, merely to name a few. The templating action of various organic entities is also discussed in A. Dyer *An Introduction to Zeolite Molecular Sieves* 60 (1988), as well as in B. M. Lok et al., The Role of Organic Molecules in Molecular Sieve Synthesis 3 *Zeolites* 282 (1983), which are incorporated by reference as if set forth at length herein. These materials are costly, and usually account for most of the materials-related expense in the synthesis of inorganic porous solids. Applicants are unaware of any use of amino acids as templates for zeolite synthesis prior to the advent of the present invention.

U.S. Pat. No. 4,665,110 to Zones teaches a process for preparing molecular sieves using an adamantane-derived template. U.S. Pat. No. 4,826,667 to Zones teaches a method for making zeolite SSZ-25 using an adamantane quaternary ammonium ion as a template.

U.S. Pat. No. 4,657,748 to Vaughan and Strohmaier discloses the zeolite ECR-1. For a discussion of a proposed structure of zeolite ECR-1, see M. E. Leonowicz and D. E. W. Vaughan, "Proposed synthetic zeolite ECR-1 structure gives a new zeolite framework topology", Nature Vol 329, No 6142, pages 819–821 (October, 1987).

Adamantane, tricyclo-[3.3.1.13,7]decane, is a polycyclic alkane with the structure of three fused cyclohexane rings. Adamantane has been found to be a useful building block in the synthesis of a broad range of organic compounds. The ten carbon atoms which define the framework structure of adamantane are arranged in an essentially strainless manner. Four of these carbon atoms, the bridgehead carbons, are tetrahedrally disposed about the center of the molecule. The other six (methylene carbons) are octahedrally disposed. U.S. Pat. Nos. 5,019,660 to Chapman and Whitehurst and 5,053,434 to Chapman teach diamondoid compounds which bond through the methylene positions of various diamondoid compounds, including adamantane. For a survey of the chemistry of diamondoid molecules, see *Adamantane, The Chemistry of Diamond Molecules*, Raymond C. Fort, Marcel Dekker, New York, 1976.

U.S. Pat. No. 5,256,391 to Chen et al. teaches a method for synthesizing a porous inorganic solid from a reaction mixture containing a diquaternary ammonium salt of an adamantane-based moiety.

The above-listed U.S. Patents are incorporated by reference as if set forth at length herein for the details of recovering and concentrating diamondoid compounds.

SUMMARY OF THE INVENTION

The present invention is directed to an improved method for synthesizing of a porous inorganic solid comprising forming a reaction mixture containing water, an alumina source, a silica source, an alkali metal oxide source, and a compound having the formula

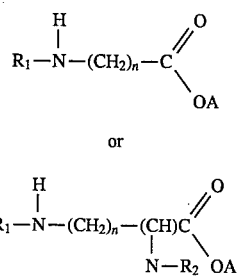

wherein $R_1$ and $R_2$ are the same or different diamondoid groups, A is hydrogen or metal ion, and n is from about 1 to about 11, preferably from about 1 to about 7, more preferably from about 1 to about 5, most preferably from about 1 to about 3. $R_1$ and $R_3$ are selected from the group consisting of adamantane, diamantane, triamantane, and more preferably comprises adamantane.

The present invention further comprises an improved method for synthesizing of a porous inorganic solid, especially large crystal ZSM-5 of unique morphology and high activity, comprising forming a reaction mixture containing water, an alumina source, a silica source, an alkali metal oxide source and a compound having the formula

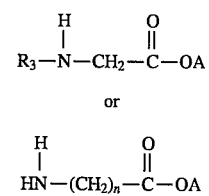

wherein $R_3$ is a diamondoid group or a cyclic alkyl group and A is hydrogen, Na+, K+ or other metal ions, n is from 2 to about 12, preferably from about 3 to about 7. $R_3$ is preferably selected from adamantyl, diamantyl or cyclohexyl groups. Reaction temperature may range from below ambient to about 400° C., and temperatures of from about 120° to about 180° C. are preferred.

In one embodiment, the method of the invention synthesizes ZSM-5 using N-2-adamantylglycine as the directing agent. In another embodiment, the method synthesizes mordenite using N-3-diamantylglycine as the directing agent or using $SiO_2/Al_2O_3$=20, 6-aminohexanoic acid or N-2-adamantylglycine as the directing agent. While N-3-diamantylglycine directs the formation of mordenite at higher initial $SiO_2/Al_2O_3$ ratios (e.g. 32.5), other agents direct the formation of mordenite at a lower initial $SiO_2/Al_2O_3$ ratios (e.g. 20–25), but direct the formation of ZSM-5 at higher initial $SiO_2/Al_2O_3$ ratios (e.g. >25).

The reaction mixture may be characterized by the following approximate molar ratios of oxides:

|  |  | Useful | Preferred |
|---|---|---|---|
| $SiO_2/Al_2O_3$ | $YO_2/X_2O_3$ | 20–80 | 20–40 |
| $H_2O/SiO_2$ | $H_2O/YO_2$ | 10–90 | 20–60 |
| Amino Acid/$SiO_2$ | AA/$YO_2$ | 0.05/0.5 | 0.1–0.2 |
| $Na^+/SiO_2$ | $Na^+/YO_2$ | 0.1–0.8 | 0.3–0.4 |

The synthesis method of the invention functions with or without added nucleating seeds. In a preferred embodiment, the reaction mixture contains no nucleating seeds. The preferred aluminum source is $NaAlO_2$, while the preferred silicon source is $SiO_2$ sol (30% $SiO_2$ in $H_2O$), which is commercially available as Catalog No. SX0140-1 from EM Science, Inc.

The term "diamondoid" is used in its usual sense, i.e., to designate the family of polycyclic alkanes exemplified by adamantane, diamantane, and triamantane and their substituted and functionalized homologs.

In a preferred embodiment, the catalyst comprises ZSM-5 synthesized using 6-aminohexanoic acid as a directing agent which can be obtained at considerably lower cost than N-2-adamantylglycine or N-cyclohexylglycine. Large crystal, high activity (high aluminum content) ZSM-5 are superior catalysts for processes currently employing small crystal ZSM-5 such as toluene alkylation, toluene disproportionation, olefin oligomerization to higher near-linear olefins, and other shape-selective processes using ZSM-5 or other medium pore zeolites as catalyst.

EXAMPLES

Example 1. Synthesis of N-2-adamantylglycine

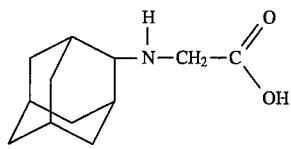

Figure 1:
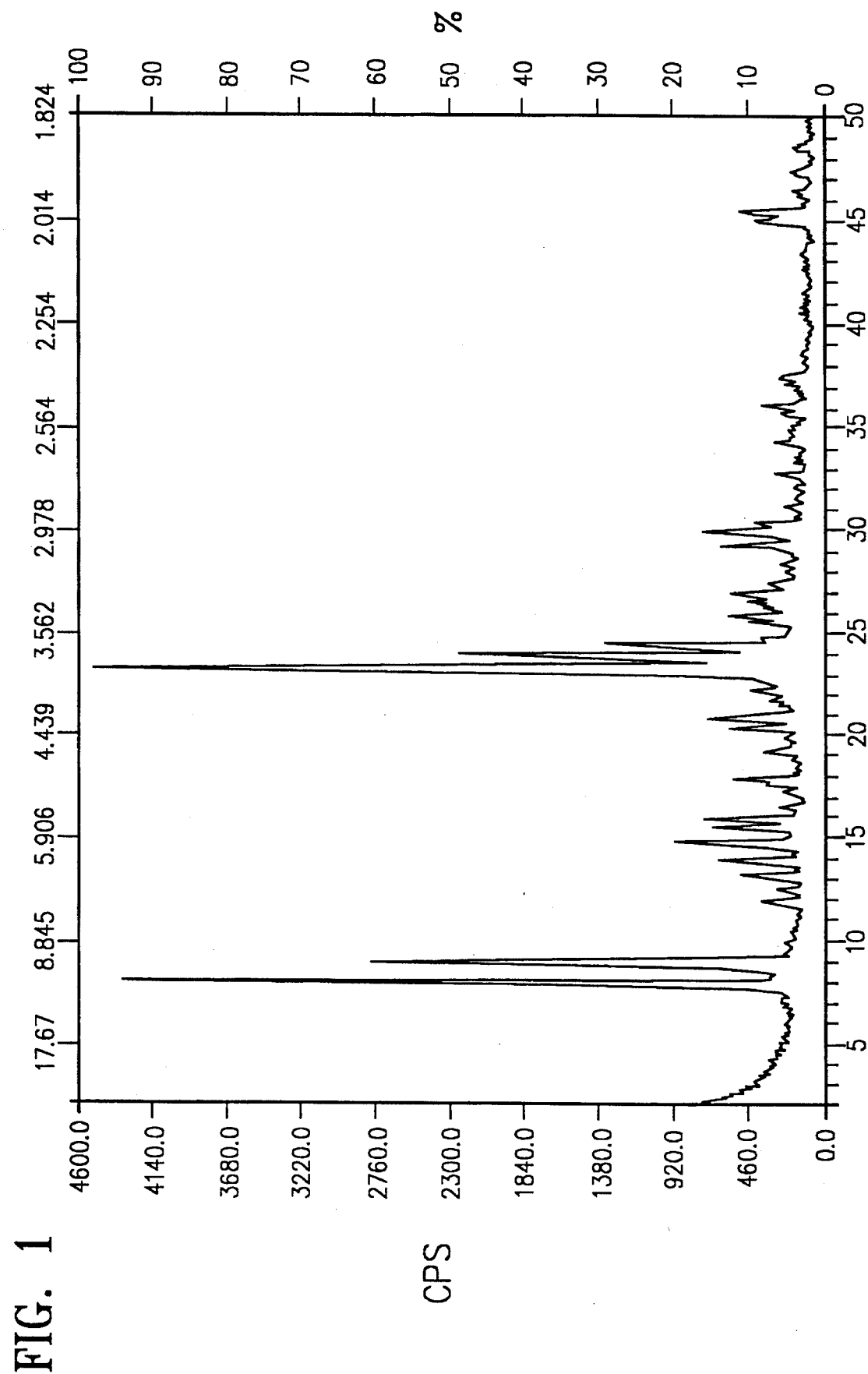
FIG. 1 is an x-ray diffraction pattern of the calcined product using N-2-adamantylglycine as the directing agent (Example 4).

A 600 ml stainless steel Parr reactor, equipped with a stirrer, two inlets, one with a tubing reaching nearly to the bottom of the reactor, and an outlet was used. Into the open reactor there were charged 100 grams of glycine (Aldrich, 99+%), 206.7 grams of 2-adamantanone (Aldrich, 99%), 10 grams of palladium (5%) on charcoal, and 300 grams of glacial acetic acid. The reactor was closed and assembled in the hood with nitrogen and hydrogen sources. The reaction mixture was bubbled with dry nitrogen, to replace the air in the reaction mixture and in the reactor, through the inlet with a tubing reaching nearly to the bottom of the reactor. The nitrogen was turned off and the reactor was pressurized with hydrogen through the other inlet. Under a hydrogen pressure of 725 psig, the reaction mixture was heated to 100° C. and stirred at this temperature for 5 days. Hydrogen was refilled whenever it was necessary. After cooling down to room temperature, the excess hydrogen was vented from the reactor and the reactor was opened. The mixture was filtered by suction to remove the solid Pd/C catalyst. The filtrate was rotavapped to remove the acetic acid and water. The crude product was washed with ether and recrystallized from a dilute aqueous solution. A pure product was obtained after two recrystallization. Elemental analysis: Calculated for $C_{12}H_{17}NO_2$: C:68.67; H:9.15; N:6.69. FoundL C:68.85; H:9.12; N:6.75. M.P.:255.4° C. (by DSC at 10° C./min. under He).

Example 2. Synthesis of N-3-diamantylglycine

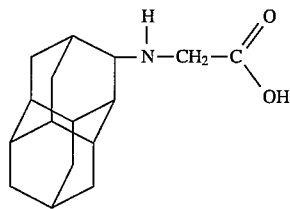

Similar equipment and procedure as described in Example 1 were employed. 12.5 grams glycine (0.166 moles, Aldrich, 99+%), 34.4 grams 3-diamantanone (0.168 miles, 99+%, synthesized by oxidation of diamantane according to Janku et al., Z. Chem. 1981, 21, 67–68. Diamantanone was purified by sublimation), 250 ml glacial acetic acid and 10 grams of Pd(5%)/C were used. The reaction was carried out in a 600 ml Parr reactor under 1000 psig hydrogen pressure at 75° C. for 4 days when the pressure dropped to 850 psig, the reaction was continued for 3 more days without further hydrogen uptake. The temperature was increased to 90° C. and the pressure rose to 875 psig. After 6 days the pressure dropped to 850 psig and the reaction was terminated. The reactor was opened after cooling to room temperature. The solid catalyst (Pd/C) was filtered by suction. The filtrate was rotavapped to remove most of the glacial acetic acid. The crude product, still contaminated by acetic acid, weighed 66.1 grams. The crude product was washed free of acetic acid and any excess 3-diamantanone with ether, then recrystallized from ethanol/water twice to give 28.4 gram purified product (yield: 65.4% based on glycine). N-3-diamantylglycine is freely soluble in ethanol but less soluble in water (1.5%). The melting behavior was observed by DSC (differential scanning calorimetry) under helium at a heating rate of 10° C./min. A sharp endotherm was observed at 220.3° C. Elemental analysis: Calculated for $C_{16}H_{23}NO_2$: C:73.53; H:8.87; N:5.36; 0:12.25. Found: C:73.59; H:8.91; N:5.33; O:12.17.

Example 3. Synthesis of cyclohexylglycine

Similar equipment and procedure as described in Example 1 were employed. 75.5 grams glycine (1.01 moles, Aldrich, 99+%), 118.4 grams cyclohexanone (1.21 moles, Aldrich 99.8%), 300 ml glacial acetic acid and 11.2 grams of Pd (5%)/C were used. The reaction was carried out in a 600 ml Parr reactor under 1000 psig hydrogen pressure at 75° C. No noticeable hydrogen uptake was noticed after 1.5 days, and the reaction was carried out for 4.5 days. The reactor was opened after cooling to room temperature. The solid catalyst was filtered by suction. The filtrate was rotavapped to remove the acetic acid and the excess cyclohexanone. A viscous crude product (brown) remained which started to crystallize upon cooling to room temperature. The crude product weighed 252.5 grams; it was stirred into excess ether whereby a white solid precipitate out. The solid was filtered and washed with ether. The filtrate was yellow and the washing was light yellow. The solid was dried in the hood overnight. The solid was redissolved in a very small amount of acetic acid and recrystallized by adding appropriate amount of ether. 144.5 grams of white crystals were recovered (91% yield based on glycine). Elemental analysis: calculated: C:61.12; H:9.62; N:8.91; 0:20.36; found: C:60.96; H:9.75; N:8.88; O:20.41.

Examples 4–10

Examples 4–10 evaluate the synthesis of zeolites using the starting mixture shown below using N-2-adamantylglycine, 6-aminohexanoic acid or N-cyclohexylglycine as the directing agent.

Composition 1:

$SiO_2/Al_2O_3=32.5$ $Al_2/Na_2=0.18$ $H_2O/SiO_2=50$ $Na+/SiO_2=0.4$ $OH-/SiO_2=0.34$

The zeolite synthesis experiments were carried out according to the following procedure:
(1) dissolve the NaOH in deionized $H_2O$, then dissolve the $NaAlO_2$ in the NaOH solution;
(2) dissolve the directing agent in the $NaAlO_2$/NaOH solution;
(3) add the $SiO_2$ sol and mix well;
(4) heat the mixture in a Parr reactor to 165° C. with stirring and stir at 165° C. for 1–2 hours;
(5) stop stirring and age the mixture statically at 165° C. for 24 hours; and
(6) restart stirring and allow crystallization of zeolite.

The zeolite synthesis proceeded in the absence of any conventional (known) organic directing agent, and in the presence of an amino acid as the directing agent.

A stock solution of NaOH and $NaAlO_2$ in deionized $H_2O$ was prepared by dissolving 16.26 grams (0.198 moles) anhydrous $NaAlO_2$, 43.55 grams NaOH (1.09 moles) in 2925 grams (162.5 moles) $H_2O$. This stock solution (Stock solution A) was used in Examples 4–10.

Example 4. Zeolite synthesis Using
N-2-adamantylglycine as the directing agent

To 268.8 grams of the $NaAlO_2$/NaOH stock solution A were added 6.1 grams (0.029 moles) N-2-adamantylglycine. The template was not readily soluble at room temperature. A clear solution was formed upon heating to 75° C. To this clear solution was added 58.1 grams $SiO_2$ sol (30% or 17.4 grams or 0.29 moles $SiO_2$) with vigorous stirring and a gel was formed. Template/$SiO_2$=0.1. An amount of 330.2 grams of the gel was transferred into a 600 ml Parr reaction. The reactor was closed and flushed with nitrogen. The mixture was heated to 165° C. under a nitrogen pressure of 400–450 psig with stirring. Approximately 2 hours after the temperature reached 165° C. the stirrer was stopped and the mixture was allowed to age statically for 24 hours. The stirrer was again turned on and the reaction was carried out at 165° C. for 11 days. A sample was taken from the reaction mixture, worked up and analyzed by X-Ray diffraction to be crystalline (ZSM-5). The reaction was terminated. Upon cooling the reactor was opened, and the solid product was separated by filtration. The product was extracted with water in a Soxhalet extractor overnight and dried at 50° C./30 mm Hg to give 12.3 gm yield. The water extract was rotavapped to dryness, and no solid was found to remain indicating that all the template was washed away during the filtration before the extraction. The as-synthesized zeolite product was analyzed to contain 0.26% C, and 0.01% N by elemental analysis. These results indicated that very little template (practically none) was inside the as-synthesized zeolite. The as-synthesized zeolite was calcined in nitrogen by heating at 2° C./minute to 538° C. then stayed at 538° C. for 10 hours. The calcination was repeated in air under the same conditions. X-Ray diffraction showed that the zeolite was pure ZSM-5 with high crystallinity. Elemental analysis: Si:41.4%; Al:2.13%. Mole ratio Si/$Al_2$ was calculated to be 37.3. The zeolite has an alpha value of 1454.

Example 5

Figure 2:
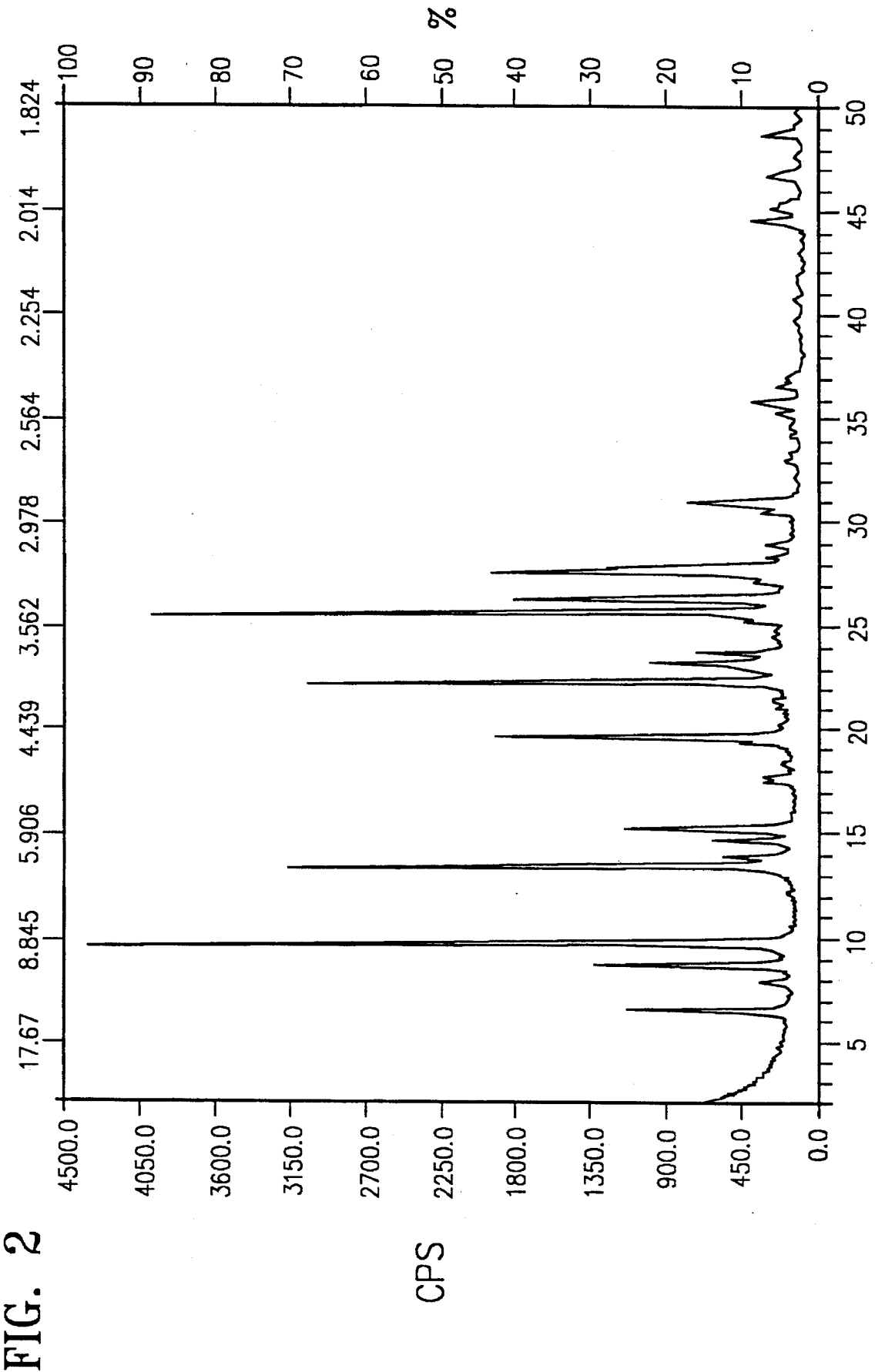
FIG. 2 is an x-ray diffraction pattern of the calcined product using N-3-diamantylglycine as the directing agent (Example 8).
Figure 3:
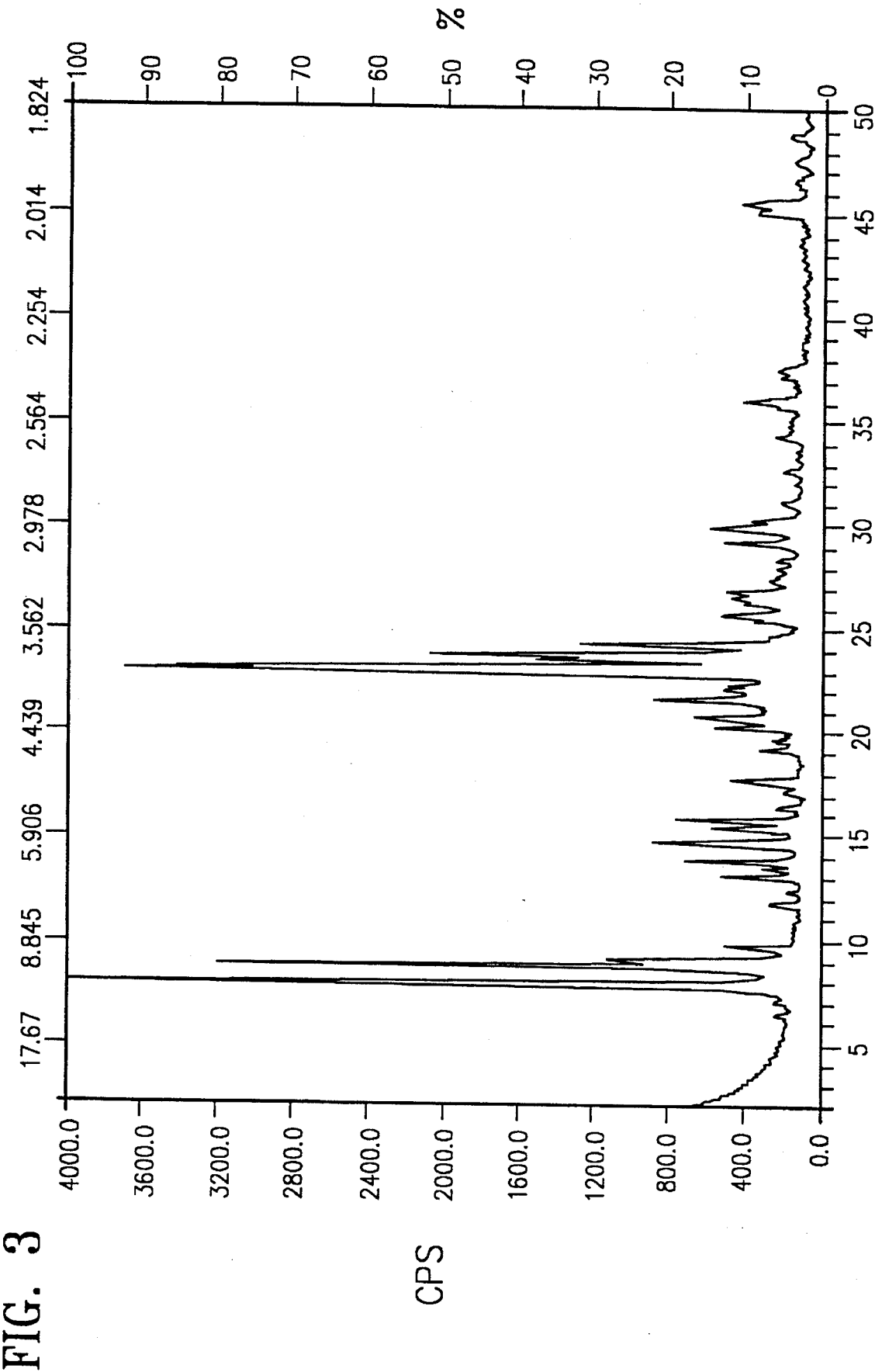
FIG. 3 is an x-ray diffraction pattern of the calcined product using N-cyclohexylglycine as the directing agent (Example 10).
Figure 4:
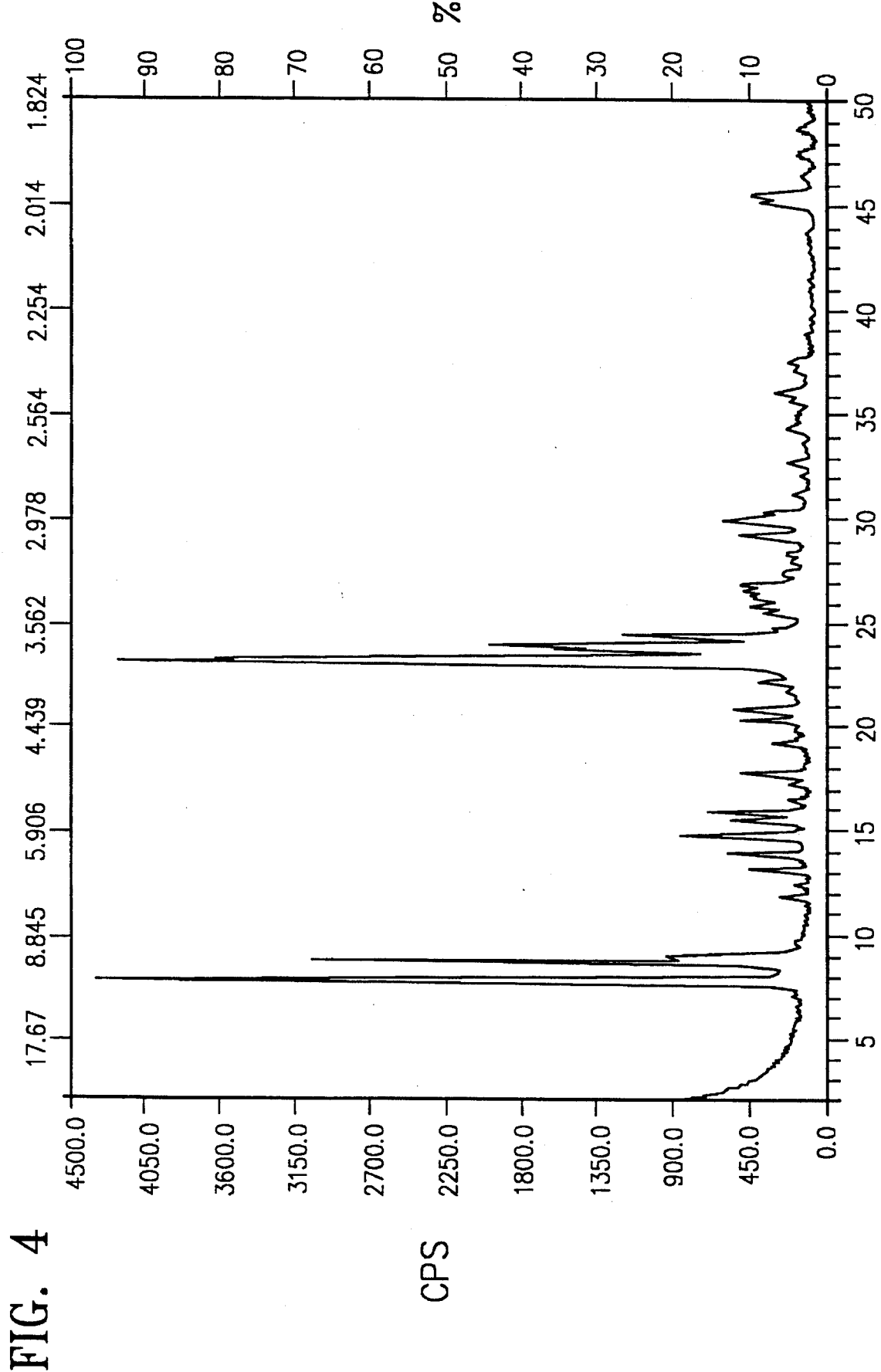
FIG. 4 is an x-ray diffraction pattern of the calcined product using 6-aminohexanoic acid as the directing agent (Example 14).
Figure 5:
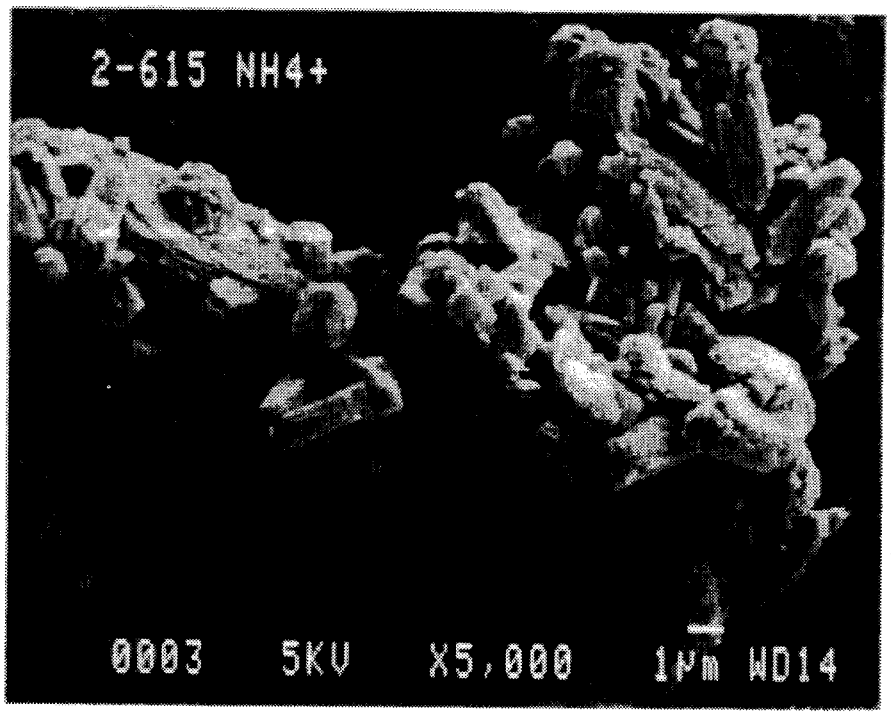
FIG. 5 is an SEM of the ZSM-5 synthesized with N-2-adamantylglycine in Example 4.
Figure 5:
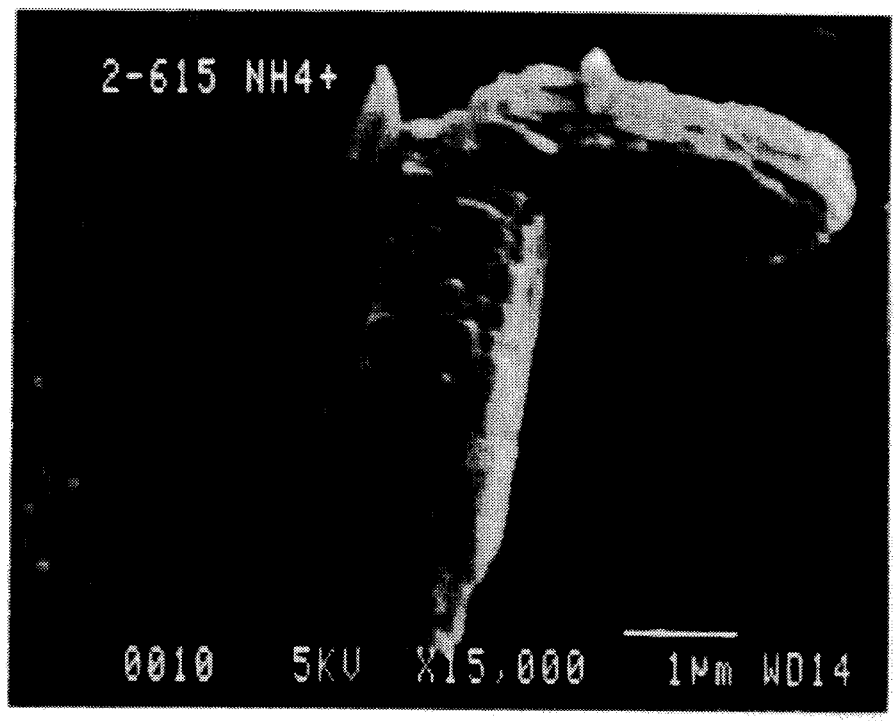
Figure 6:
FIG. 6 is an SEM of the mordenite synthesized with N-3-diamantylglycine in Example 8.
Figure 6:
Figure 7:
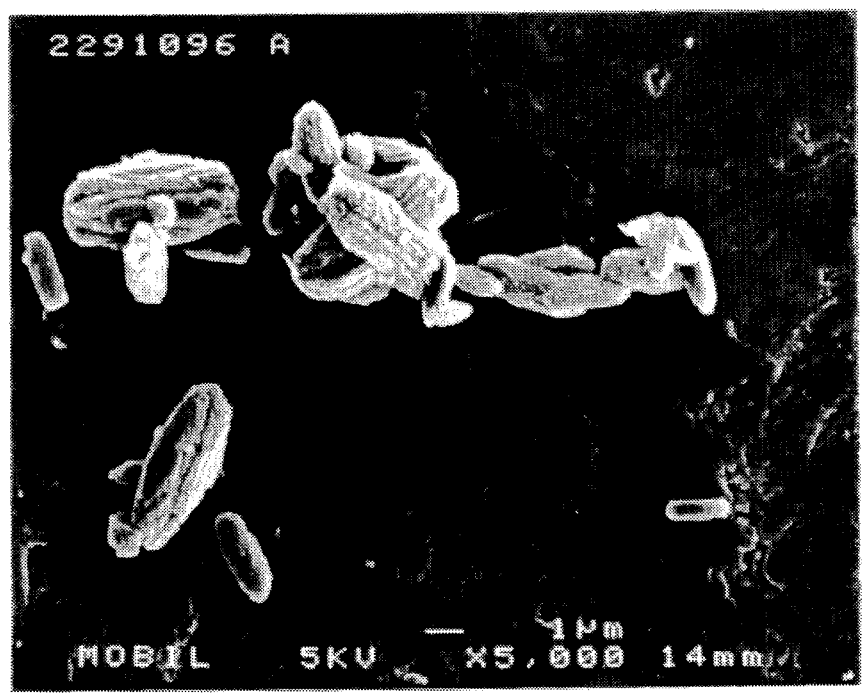
FIG. 7 is an SEM of the ZSM-5 synthesized with 6-aminohexanoic acid in Example 14.
Figure 7:
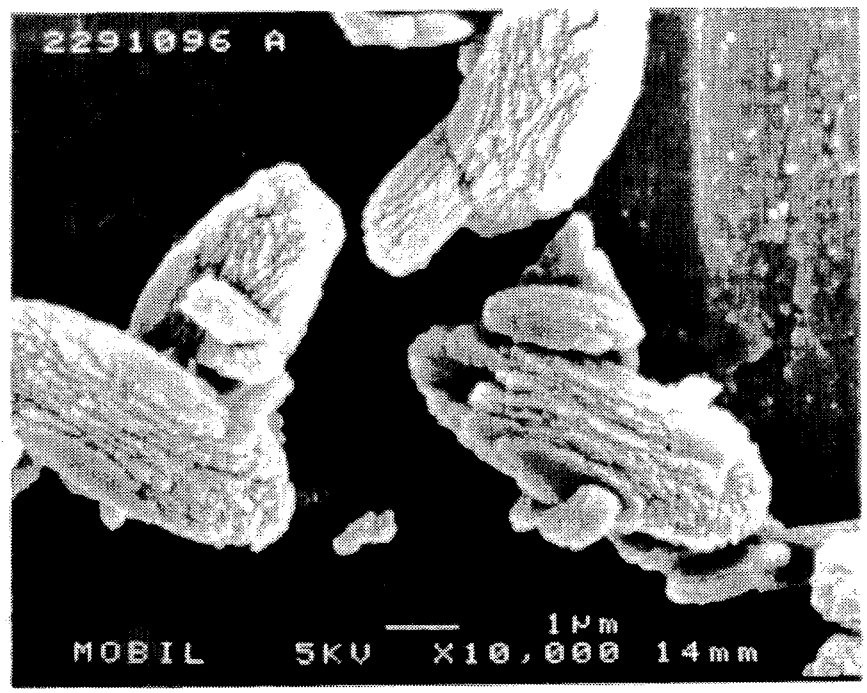
Figure 8:
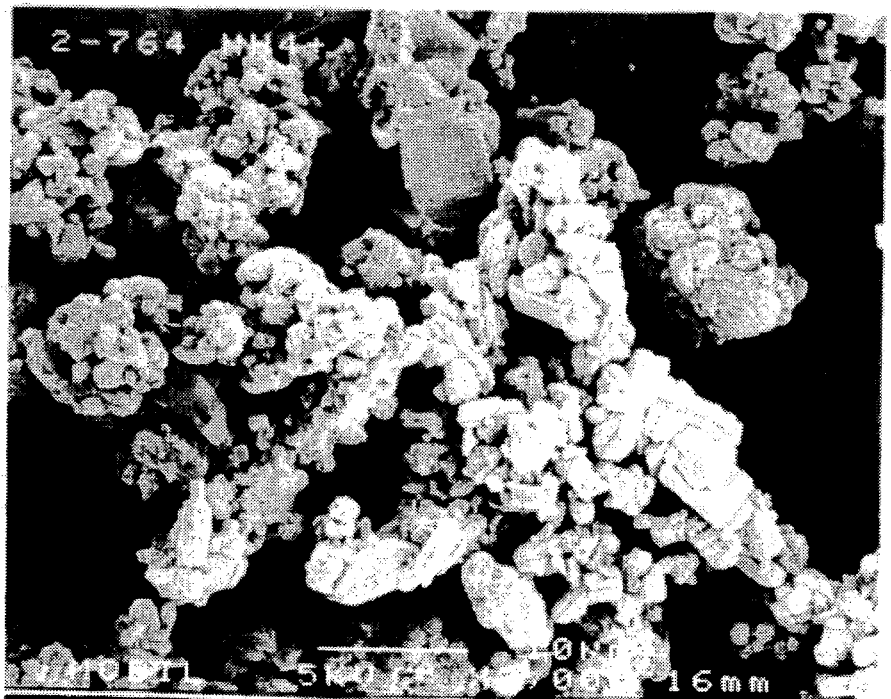
FIG. 8 is an SEM of the ZSM-5 synthesized with N-cyclohexylglycine in Example 10.
Figure 8:
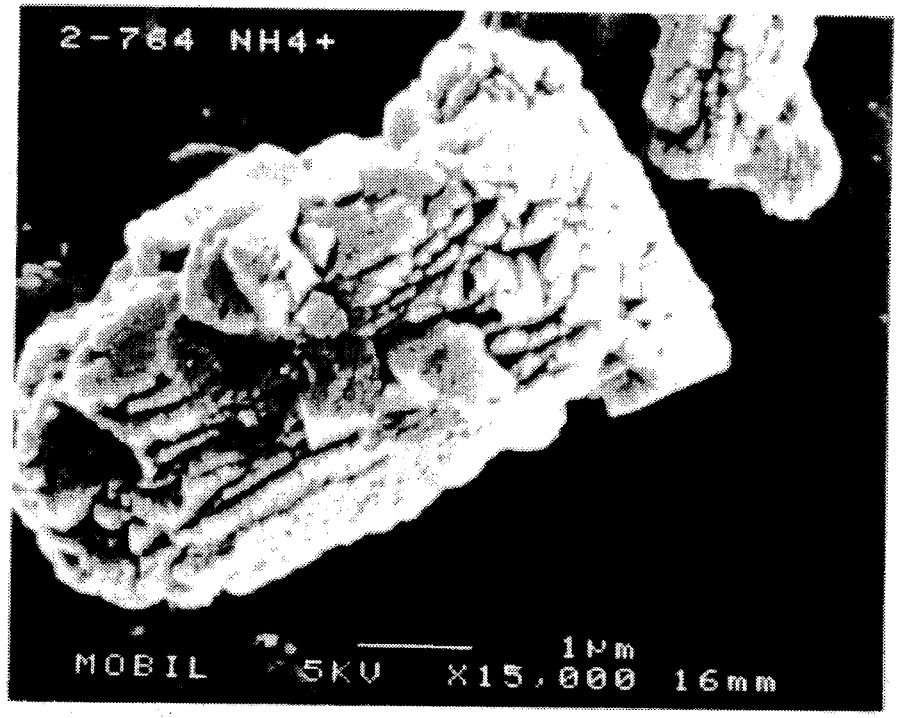
Figure 9:
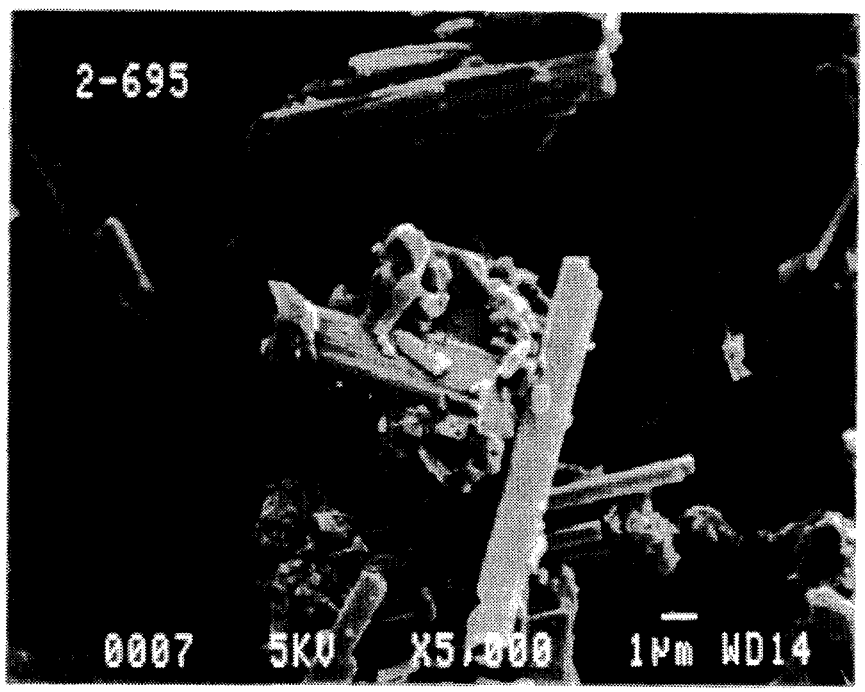
FIG. 9 is an SEM of the mordenite synthesized with 6-aminohexanoic acid in Example 12.
Figure 9:
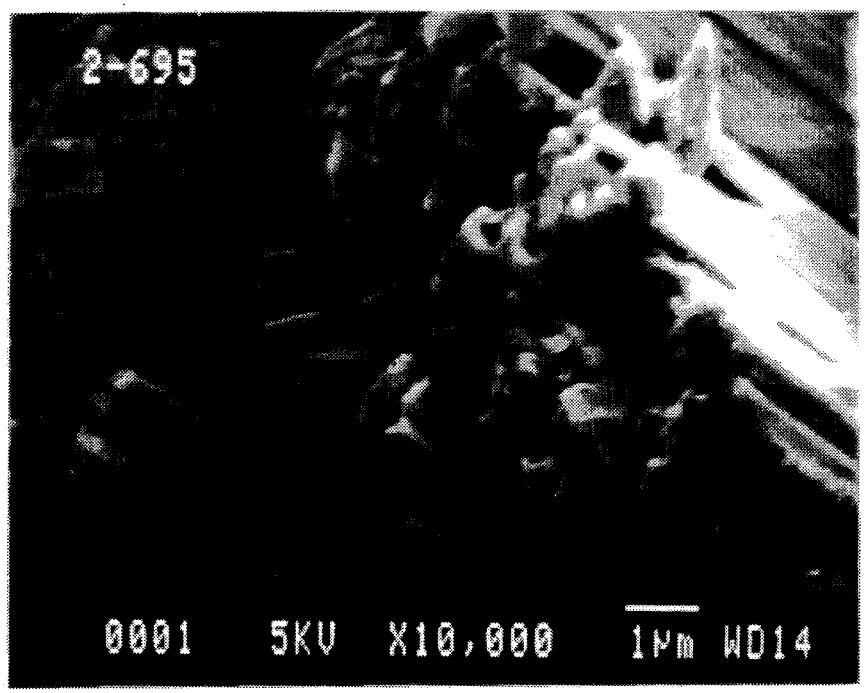

Synthesis of zeolite using the same template as in Example 4 except at a higher template/$SiO_2$ ratio was carried out. To 268.8 grams of the $NaAlO_2$/NaOH stock solution were added 10.2 grams (0.049 moles) N-2-adamantylglycine. The template was not readily soluble at room temperature. Upon heating and stirring a cloudy solution was formed indicating that the solubility limit of the template in the stock solution was probably reached. To this hot cloudy solution were stirred in 58.1 grams $SiO_2$ sol (30%, 17.4 grams or 0.29 moles $SiO_2$) and a gel was formed. Template/$SiO_2$=0.17. 333.9 Grams of this gel were transferred into a 600 ml Parr reactor and the reaction was aged and carried out under a nitrogen pressure of 650–700 psi and at 165° C. as described in Example 4. After 11 days a sample of the reaction mixture was taken, worked up and analyzed by X-Ray diffraction to be a crystalline material (ZSM-5). The reaction was terminated and the product was worked up as described in Example 4. X-Ray diffraction (see FIG. 2) showed that the calcined zeolite had the structure of ZSM-5 with even higher crystallinity than the product obtained in Example 4.

Example 6

Zeolite synthesis using the same starting materials and under the same conditions but without a template was carried out to compare with Examples 4 & 5. Although no template was used, 448.1 grams of the $NaAlO_2$/NaOH stock solution were heat up to 75° C. as described in Example 4. To this solution and with vigorous stirring 96.8 grams $SiO_2$ sol were added, a thin gel (definitely thinner than those formed in Examples 4 & 5) was formed. 539.2 Grams of this gel were transferred into a 600 ml Parr reactor. The reaction was aged and carried out at 165° C. and under a nitrogen pressure of ~500 psig as described in Example 4. After 6 days a sample was taken from the reaction mixture, worked up and analyzed by X-Ray diffraction to be crystalline. The reaction was terminated. Upon cooling the reactor was opened. The solid product was collected and extracted with boiling water as described in Example 4. Elemental analysis of the as-synthesized zeolite showed 0.26% C and 0.01% N. Since there was no template used in this synthesis, these results indicated that there was no template in the as-synthesized ZSM-5 in Example 4 as similar results were obtained in C and N analyses. X-Ray diffraction of the calcined zeolite (see FIG. 10) showed the product was a mixture of primarily Mordenite with minor peaks of ZSM-5. Elemental analysis: Si:38.62%; Al:3.42%. The Si/$Al_2$ ratio was calculated to be 21.7

Example 7

Example 6 was repeated except that the reaction time was 11 days. The X-Ray diffraction (see FIG. 11) showed that the calcined product was a mixture of mordenite and higher amount of ZSM-5 than in Example 6.

Example 8. Zeolite Synthesis using N-3-diamantylglycine as the directing agent To 200 grams of NaAlO$_2$/NaOH Stock solution A were added 9.40 grams (0.036 moles) N-3-diamantylglycine as a nucleating agent. N-3-diamantylglycine is not soluble in solution A at room temperature. A clear solution was formed upon heating to 70°–75° C. To this clear solution was added 43.21 grams SiO$_2$ sol (30% SiO$_2$ in H$_2$O, SiO$_2$:0.216 moles) with vigorous stirring and a gel was formed. Nucleating agent/SiO$_2$=0.17. The gel was transferred into a 600 ml Parr reactor. The reactor was closed and flushed with nitrogen. The mixture was heated to 165° C. with stirring and stayed at 165° C. for an hour. The stirrer was stopped and the mixture was aged statically at 165° C. for 24 hours. The stirrer was restarted and the reaction was carried out at 165° C. for 6 days. Upon cooling the reactor was opened, and the solid product was separated by filtration. The product was extracted with water in a Soxhlet extractor overnight to remove all the N-3-diamantylglycine present in the mixture. The product was shown by x-ray differention to be mordenite. Elemental analysis of the dried product: C:0.15; Si:34.50; Al:2.48. The carbon analysis indicates that no N-3-diamantylglycine was inside the zeolite channels, or it acted as an exterior directing agent. The Si and Al analyses show that the zeolite has a SiO$_2$/Al$_2$O$_3$= 26.4. NMR results show that SiO$_2$/Al$_2$O$_3$= 29.1.

Example 9. Zeolite synthesis using 6-aminohexanoic acid as the directing agent To 200 grams of NaAlO$_2$/NaOH Stock solution A were added 4.72 grams 6-aminohexanoic acid (Aldrich 98%, 0.036 moles). A clear solution was formed at room temperature. The mixture was heated to 70°–75° C. (to be consistent with Examples 4–8) before the addition of 43.21 grams SiO$_2$ sol (30% SiO$_2$ in H$_2$O). A thin gel is formed. The gel was transferred into a 600 ml Parr reactor. The reactor was closed and flushed with nitrogen. The mixture was heated at 165° C. with stirring for an hour. The stirrer was stopped and the mixture was aged statically for 24 hours. The stirring was restarted and the reaction was carried out at 165° C. for 8 days. A crystalline product identified by XRD as ZSM-5 was obtained. SEM showed that the ZSM-5 contained large crystals (>1 micron). Elemental analysis: C:0.14; Si:32.60; Al:2.43. Again it is indicated that the directing agent worked externally; SiO$_2$/Al$_2$O$_3$=25.8. NMR determinations of framework Al and Si gave a SiO$_2$/Al$_2$O$_3$=28.8. The alpha value of the zeolite is determined to be 998.

Example 10. Zeolite synthesis using N-cyclohexylglycine as the directing agent To 400 grams NaAlO$_2$/NaOH solution A were added 11.5 grams N-cyclohexylglycine (0.073 moles). A clear solution was formed at room temperature. Again, in order to be consistent with the other experiments in this series, the solution was heated to 70°–75° C. before the addition of 86.4 grams of SiO$_2$ sol (30% SiO$_2$ in H$_2$O). A thin gel was formed: N-cyclohexylglycine/SiO$_2$=0.17; pH of gel=12.7. The gel was transferred into a 600 ml Parr reactor. The reactor was closed and purged with nitrogen. The reaction was heated to and stirred at 165° C. for an hour. The stirrer was stopped and the reaction was aged statically at 165° C. for 24 hours. The stirrer was restarted and the reaction was carried out at 165° C. for 7 days. The reactor was opened after cooling. The product was filtered and washed with water until the washing was neutral. The product was dried at 110° C. under vacuum: weight: 24.3 grams. The as synthesized zeolite was identified to be ZSM-5. Elemental analysis: C:0.59; N:0.08; Si: 33.06; Al:2.85. The C, N analyses indicate there was somewhat more nucleating agent remaining in the zeolite but the amount is still negligible; SiO$_2$/Al$_2$O$_3$=22.2.

Example 11

This example shows that zeolite crystallization does not take place when the NaOH concentration in the starting gel is too low.

A stock solution containing 2925 grams H$_2$O (162.5 moles), 21.8 grams NaOH (0.545 moles), 16.26 grams NaAlO$_2$ (0.198 moles) was prepared.

In each of six 600 ml Parr reactor were charged 448.3 grams of this stock solution. To each of the six reactors were added 10.6 grams (0.0808 moles) 6-aminohexanoic acid. The solutions were heated to 70°–75° C., and to each solution were added 96.8 grams SiO$_2$ sol (30% in H$_2$O). The molar ratios of the starting gel are:

SiO$_2$/Al$_2$O$_3$=32.2

Na+/SiO$_2$=0.23

6-aminohexanoic acid/SiO$_2$= 0.17

H$_2$O/SiO$_2$=58.7

The reactors were closed the reactions were carried out at 165° C. as described in Example 9. However, none of the six reactions gave any crystalline product after 7 days. These reactions showed that too low a NaOH concentration is not favorable for the zeolite crystallization under our experimental conditions.

Example 12

Example 12 evaluates zeolite synthesis using a lower SiO$_2$/Al$_2$O$_3$ in starting solution as shown below:

SiO$_2$/Al$_2$O$_3$=20

Al$_2$/Na$_2$=0.25

Na+/SiO$_2$=0.40

H$_2$O/SiO$_2$=50.5

A stock solution was prepared by dissolving 38.6 grams (0.965 moles) NaOH in 2925 grams deionized H$_2$O followed by dissolving 26.39 (0.322 moles) anhydrous NaAlO$_2$ in the NaOH solution. This stock solution (Stock solution B) was used in Example 12.

To 448.7 grams of NaAlO$_2$/NaOH solution B were added 10.6 grams (0.081 moles) 6-aminohexanoic acid with stirring. A clear solution was formed at room temperature. The solution was heated to 70°–75° C., and 96.8 grams SiO$_2$ sol (30% in H$_2$O) were added with vigorous stirring. A thin gel was formed: directing agent/SiO$_2$ mole ratio=0.25; pH of the gel was 13.3. The gel was transferred to a 600 ml Parr reactor. The reactor was closed and flushed with nitrogen. The mixture was heated and stirred at 165° C. for an hour. The stirrer was turned off for the mixture to age statically for 24 hours. The stirrer was restarted and the reaction was carried out at 165° C. for 7 days. The product was filtered (pH of filtrate =11.3) and washed to neutral pH with water. X-ray diffraction showed that the product was mordenite. Elemental analysis of dried product was C:0.19, N:0, Si:35.26, and Al:3.55. These analytical results show that the directing agent was not present in the zeolite, and the zeolite has a SiO$_2$/Al$_2$O$_2$ ratio of 19.0. The filtrate from the reaction was rotavapped to dryness. Elemental analysis of the solid recovered showed C:38.53 and N:7.50. The C/N ratio is calculated to be 5.99 which is identical to the C/N=6 of 6-aminohexanoic acid charged as the directing agent. These results indicated that the directing agent did not decompose during the zeolite synthesis. The alpha value was surprisingly low and fast aging, i.e., 137-83.

The following Examples 13–21 illustrate zeolite synthesis in a one-gallon reactor using 6-aminohexanoic acid as the directing agent under varying experimental conditions.

Example 13

This example uses a different starting mixture using 6-aminohexanoic acid as the directing agent.

Reagents:

$H_2O$ 2635.8 grams (146.4 moles)

NaOH 39.2 grams (0.981 moles)

$NaAlO_2$ (freshly dried) 14.7 grams (0.179 moles)

6-aminohexanoic acid 63.6 grams (0.485 moles)

$SiO_2$ sol (30% in $H_2O$) 523.4 grams $SiO_2$=2.61 moles; $H_2O$ 20.4 moles)

The following are the molar ratios:

$SiO_2/Al_2O_3$=29.2

Na+/$SiO_2$=0.44

6-aminohexanoic acid/$SiO_2$= 0.19

$H_2O/SiO_2$=64

The water was charged into the one-gallon reactor. With stirring the NaOH was added. When a clear solution was formed, the $NaAlO_2$ was added. The mixture was stirred until complete dissolution. The solution was heated to 70°–75° C. and the $SiO_2$ sol was added with stirring. A thin gel was formed. The reactor was closed and heated to 165° C. with stirring at 100 rpm. After stirring at 165° C. for 1.9 hours, the stirrer was turned off and the mixture was allowed to age statically for 24 hours. The stirrer was restarted and the reaction was carried out at 165° C. for 2 days. The reactor was opened after cooling to room temperature. The product was filtered by suction and washed to neutral pH with deionized water. The as-synthesized zeolite was dried. Five grams were calcined in air by heating to 538° C. at 2° C./minute and stayed at 538° C. for 10 hours. The calcined zeolite was exchanged with 1N $NH_4NO_3$ and recalcined in air to the H+ form. XRD showed that the product was ZSM-5 and SEM showed large crystals were formed. Elemental analysis revealed Si:35.57% and Al:3.09%, corresponding to a mole ratio of $SiO_2/Al_2O_3$ of 22.1. The alpha value was determined to be >1000.

Example 14

The same starting materials and procedure were used as described in Example 13 except that the reaction was carried out for 3 days instead of 2 days (after one day static aging at 165° C.). Similar to Example 11, the product was large crystal ZSM-5 of high activity.

Example 15

The same starting materials and procedure were used as described in Example 13 except that the reaction was carried out for 4 days instead of 2 days (after one day static aging at 165° C.). Similar to Examples 13 and 14, the product was large crystal ZSM-5 of high activity.

Example 16

This example evaluates zeolite synthesis using a lower starting $SiO_2/Al_2O_3$ ratio and a higher directing agent/$SiO_2$ ratio, aging the gel at room temperature and carrying out the reaction at a higher temperature.

Reagents:

$H_2O$: 2352.0 grams (130.67 moles)

NaOH: 35.0 grams (0.875 moles)

$NaAlO_2$: 13.1 grams (0.159 moles)

6-aminohexanoic acid: 83.29 grams (0.635 moles)

$SiO_2$ sol (30% in $H_2O$): 416.7 grams ($SiO_2$ 2.08 moles; $H_2O$ 16.2 moles)

The corresponding molar ratios are:

$SiO_2/Al_2O_3$=26.1

Na+/$SiO_2$=0.50

6-aminohexanoic acid/$SiO_2$=0.31

$H_2O/SiO_2$= 70.6

The $H_2O$ was added into a one-gallon Parr reactor. The NaOH, $NaAlO_2$, and the 6-aminohexanoic acid were successively dissolved into the $H_2O$. At room temperature and with stirring, the $SiO_2$ sol was added to the mixture and a thin gel was formed. The reactor was closed, pressurized with 148 psi nitrogen, and stirred at 100 rpm at room temperature for an hour. The stirrer was stopped and the mixture was aged statically at room temperature for 24 hours. The reaction mixture was heated to 185° C. with stirring at 100 rpm. After 24 hours, a sample was taken. X-ray diffraction showed that the product started to crystallize. A second sample was taken after 2 days. X-ray diffraction showed that the product was highly crystalline ZSM-5. The reaction was turned off. The product was worked up in the usual manner. Weight of dry product was 123.4 grams. Element analysis of the as-synthesized zeolite3 showed C:0.46, H:0.72, N:0.11. These results again indicated that the directing agent did not reside in the zeolite.

Example 17

This example evaluates zeolite synthesis without static aging.

Reagents:

$H_2O$:2635.4 grams (146.4 moles)

NaOH: 39.2 grams (0.981 moles)

$NaAlO_2$: 14.7 grams (0.179 moles)

6-aminohexanoic acid: 63.6 grams (0.485 moles)

$SiO_2$ sol (30% in $H_2O$): 580.8 grams (SiO=2.90 moles; $H_2O$ 22.6 moles)

The molar ratios are:

$SiO_2/Al_2O_3$=32.5

Na+/$SiO_2$=0.4

6-aminohexanoic acid/$SiO_2$=0.17

$H_2O/SiO_2$= 58.3

The procedure used here was essentially the same as described in Example 16 except that there was no static aging. After the reactor was closed, the reaction was carried out at 165° C. with stirring at 100 rpm for 5 days. The reactor was opened after cooling to room temperature. The product was filtered by suction and washed to neutral pH with deionized $H_2O$ and dried at 110° C. under vacuum. Weight of as-synthesized zeolite was 155 grams. Five grams were calcined, exchanged with 1N $NH_4NO_3$ and calcined to the H+ form. XRD showed that the product was ZSM-5 and SEM showed that large crystals were formed. The alpha value was >1000.

Example 18

The same starting materials and procedure as described in Example 17 were used (no static aging). A sample was taken from the reaction after 44 hours and the product was determined to be ZSM-5. The reaction was carried out for a total of 3 days. The product weighed 171 grams. The product was large crystal ZSM-5 of high activity.

Example 19

This example evaluates zeolite synthesis using a starting mixture of higher $SiO_2/Al_2O_3$ ratio. It also shows that the starting gel can be prepared at room temperature as well as at 70°–75° C.

Reagents:

$H_2O$: 2635.8 grams (146.43 moles)

NaOH: 39.2 grams (0.98 moles)

$NaAlO_2$: 13.2 grams (0.161 moles)

6-aminohexanoic acid: 63.6 grams (0.484 moles)

$SiO_2$ sol (30% in $H_2O$): 580.8 grams ($SiO_2$: 2.9 moles; $H_2O$: 23.6 moles)

The starting molar ratios are as follows:

$SiO_2/Al_{23}$= 36

$Na/SiO_2$=0.39

6-aminohexanoic acid/$SiO_2$=0.17

$H_2O\ SiO_2$=58.6

The water was added to a one-gallon Parr reactor. The NaOH was added with stirring until a clear solution was formed. The $NaAlO_2$ was added with stirring until it was all dissolved. The $SiO_2$ sol was added to the mixture with vigorous stirring at room temperature. pH of the starting gel: 13.0. The Parr reactor was closed and the reaction was heated to 165° C. and stirred at 100 RPM. After 2 days, a sample was taken through a dip tube. The liquid had a pH of 11.3; the solid was a highly crystalline ZSM-5. The reaction was terminated. The solid was washed until the washing was neutral and dried. Weight of product: 154.7 grams.

Example 20

In this example the same procedure used in Example 19 was used (preparing the starting gel at room temperature, no static aging) except that the starting gel had a different molar ratio.

Reagent:

$H_2O$: 2635.8 grams (146.4 moles)

NaOH: 38.4 grams (0.96 moles)

$NaAlO_2$: 16.4 grams (0.20 moles)

6-aminohexanoic acid: 63.6 grams (0.484 moles)

$SiO_2$ (30% in $H_2O$): 580.8 grams ($SiO_2$: 2.90 moles; $H_2O$: 22.6 moles)

The product was a highly crystalline ZSM-5 and weighed 163.4 gram.

Example 21

This example evaluated the possibility of utilizing the reactor more effectively by using less water in the zeolite synthesis.

Reagents:

$H_2O$: 2230 grams (123.9 moles)

NaOH: 78.4 grams (1.96 moles)

$NaAlO_2$: 29.4 grams (0.359 moles)

6-aminohexanoic acid: 127.2 grams (0.970 moles)

$SiO_2$ sol (30% in $H_2O$): 1161.6 grams ($SiO_2$: 5.80 moles) $H_2O$: 45.2 moles)

The molar ratios in the starting gel are:

$SiO_2/Al_2O_3$= 32.3

$Na/SiO_2$= 0.40

6-aminohexanoic acid/$SiO_2$= 0.17

$H_2O/SiO_2$=29.2

The procedure of Examples 17 and 18 was followed. Highly crystalline ZSM-5 (large crystals) was obtained.

Example 22

The same molar ratios of the reagents in the starting mixture and the same procedure as described in Example 21 except a lower reaction temperature of 130° C. were employed in this synthesis. The reaction was carried out for 11 days and large crystal ZSM-5 was obtained. Elemental analysis showed a $SiO_2/Al_2O_3$ ratio of 25.1.

The following examples evaluated the feasibility of using solid silica source and at high solid content in the reaction mixture. The solid silica source used was UltraSil(trade name). The UltraSil used was determined to contain 90% $SiO_2$ and 10% $H_2O$.

Example 23

Reagents:

$H_2O$: 2228.6 gms (123.8 moles)

NaOH: 78.5 gms (1.96 moles)

$NaAlO_2$: 29.3 gms (0.357 moles)

6-aminohexanoic acid: 127.2 gms (0.970 moles)

UltraSil: 348.5 gms ($SiO_2$: 313.7 gms or 5.22 moles; $H_2O$: 34.9 gms or 1.94 moles)

The molar ratios in the starting gel are:

$SiO_2/Al_2O_3$= 29.2

$Na/SiO_2$= 0.44

6-aminohexanoic acid/$SiO2$=0.19

$H_2O/SiO_2$= 24.1

The water was charged into a one-gallon Parr reactor. The NaOH, $NaAlO_2$, 6-aminohexanoic acid were successively dissolved into the water with stirring. The solution was heated to 70°– 75° C. and the $SiO_2$ was added with stirring. A gel was formed. The reactor was closed and the reaction was carried out at 140° C. and 100 RPM for 4 days. The reactor was opened after cooling to room temperature. The product was filtered and washed to neutral pH with deionized water. The dried product weighed 296.5 grams. Thirty grams of the product were calcined in air and exchanged with and calcined to the H+ form. The product was a large crystal ZSM-5 which has an alpha value of 1664 after 3 minutes, 1801 after 1 hour.

Example 24

This example describes zeolite synthesis employing the same reagents and the same procedure as described in Example 23, except that the reaction was carried out at 150° C. for 3 days. Similar highly active, large crystal ZSM-5 was obtained. The product weighed 251.5 grams, had an alpha value of 1197 after 3 minutes 1395 after 1 hour.

Example 25

This example employed the same procedure of synthesis as described in Example 24 but different molar ratios of reagents in the starting mixture.

Reagents:

$H_2O$: 2189.9 gms (121.7 moles)

NaOH: 78.5 gms (1.96 moles)

$NaAlO_2$: 29.3 gms (0.357 moles)

6-aminohexanoic acid: 127.2 gm (0.970 moles)

UltraSil: 387.2 gms ($SiO_2$: 348.5 gms or 5.80 moles; $H_2O$:38.7 gms or 2.15 moles)

The molar ratios in the starting mixture are:

$SiO_2/Al_2O_3$=32.5

Na/$SiO_2$=0.40

6-aminohexanoic acid/$SiO_2$=0.17

$H_2O/SiO_2$=21.4

The reaction was carried out at 150° C. for 3 days. The product was large crystal ZSM-5 and weighed 313.5 gms. The $H^+$ form of the product had an alpha value of 873 after 3 minutes and 899 after an hour.

Example 26

This example employed the same molar ratios of the reagents in the starting mixture and the same procedure as described in Example 25 except that the reaction was carried out at 140° C. for 4 days. Similar large crystal ZSM-5 was obtained.

Example 27

This example employed the same molar ratios of the reagents in the starting mixture and the same procedure as described in Example 25 except that the reaction was carried out at 165° C. for 1 day. Similar large crystal ZSM-5 was obtained.

Example 28

This example employed the same procedure as in Example 25 except 10% less NaOH was used in the starting mixture:

Reagents:

$H_2O$:2189.9 gms (121.7 moles)

NaOH: 69.2 gms (1.73 moles)

$NaAlO_2$: 29.3 gms (0.357 moles)

6-aminohexanoic acid: 127.2 gm (0.970 moles)

UltraSil: 348.5 gms ($SiO_2$: 313.7 gms or 5.22 moles; $H_2O$: 34.9 gms or 1.94 moles)

The molar ratios in the starting mixture were:

$SiO_2/Al_2O_3$: 29.2

Na/$SiO_2$: 0.40

6-aminohexanoic acid/SiO2: 0.19

$H_2O/SiO_2$: 23.7

Similar large crystal ZSM-5 was obtained.

Example 29

This example employed the same molar ratios in the starting mixture for zeolite synthesis as in Example 28 and the same procedure. The reaction was carried out at 140° C. for 4 days. Similar large crystal ZSM-5 was obtained.

Changes and modifications in the specifically described embodiments can be carried out without departing from the scope of the invention which is intended to be limited only by the scope of the appended claims.

What is claimed is:

1. A method for synthesizing a porous inorganic solid selected from the group consisting of ZSM-5 and mordenite, comprising the steps of:

(a) forming a reaction mixture containing water, an alumina source, a silica source, an alkali metal oxide source, and an amino acid compound, R, having the formula:

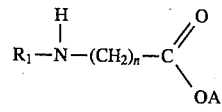

or

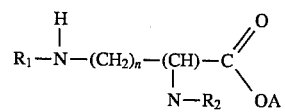

wherein $R_1$ and $R_2$ are the same or different diamondoid groups, A is hydrogen or a metal ion, and n is from about 1 to about 11; and (b) recovering the porous inorganic solid from said reaction mixture of step (a).

2. The method of claim 1 wherein n is from about 1 to about 7.

3. The method of claim 1 wherein n is from about 1 to about 5.

4. The method of claim 1 wherein n is from about 1 to about 3.

5. The method of claim 1 further comprising crystallizing said microporous composition from said reaction mixture in the absence of added nucleating seeds.

6. The method of claim 1 wherein said reaction mixture is further characterized by the following molar ratios of oxides:

$SiO_2/Al_2O_3$: 10 to 80

$H_2O/SiO_2$: 20 to 90

R/$SiO_2$: 0.05 to 0.5.

7. The method of claim 6 wherein n is from about 1 to about 7.

8. The method of claim 7 wherein n is from about 1 to about 5.

9. A method for synthesizing a porous inorganic solid selected from the group consisting of ZSM-5 and mordenite, comprising the steps of:

(a) forming a reaction mixture containing water, an alumina source, a silica source, an alkali metal oxide source, and a compound having the formula:

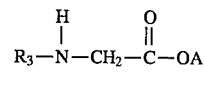

or

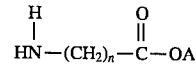

wherein $R_3$ is a diamondoid group or a cyclic alkyl group and A is hydrogen, or a metal ion, and n is from 2 to about 12; and (b) recovering the porous inorganic solid from said reaction mixture of step (a).

10. The method of claim 9 wherein said metal ion is Na+ or K+.

11. The method of claim 10 wherein n is from about 3 to about 7.

* * * * *